(12) United States Patent
Gresham et al.

(10) Patent No.: US 11,082,079 B2
(45) Date of Patent: Aug. 3, 2021

(54) SPUR MITIGATION IN A HETERODYNE UPCONVERSION SYSTEM

(71) Applicant: Anokiwave, Inc., San Diego, CA (US)

(72) Inventors: Robert Ian Gresham, Somerville, MA (US); Shmuel Ravid, Newton, MA (US); Kristian N. Madsen, Napa, CA (US); Tissana T. Kijsanayotin, La Jolla, CA (US)

(73) Assignee: ANOKIWAVE, INC., San Diego, CA (US)

( * ) Notice: Subject to any disclaimer, the term of this patent is extended or adjusted under 35 U.S.C. 154(b) by 0 days.

(21) Appl. No.: 16/987,344

(22) Filed: Aug. 6, 2020

(65) Prior Publication Data

US 2021/0044316 A1 Feb. 11, 2021

Related U.S. Application Data

(60) Provisional application No. 62/884,421, filed on Aug. 8, 2019.

(51) Int. Cl.
*H04B 1/403* (2015.01)

(52) U.S. Cl.
CPC .................. *H04B 1/406* (2013.01)

(58) Field of Classification Search
CPC ........ H04B 1/406; H04B 1/401; H04B 1/403; H04B 1/44; H04B 2001/0491; H04B 1/26
See application file for complete search history.

(56) References Cited

U.S. PATENT DOCUMENTS

| 4,234,965 A * | 11/1980 | Bickley | H04B 1/18 455/120 |
| 5,230,094 A * | 7/1993 | Kitching | H04B 1/26 455/183.2 |
| 8,160,529 B1 * | 4/2012 | Clement | H03D 7/166 455/255 |
| 2004/0097214 A1 | 5/2004 | Gard et al. | |
| 2005/0266806 A1 * | 12/2005 | Soe | H04B 1/403 455/88 |
| 2006/0073800 A1 * | 4/2006 | Johnson | H03D 7/166 455/182.3 |

(Continued)

FOREIGN PATENT DOCUMENTS

FR 3024550 A1 2/2016

OTHER PUBLICATIONS

Israel Patent Office, Abu Rabia Nizar, Authorized officer, International Search Report and Written Opinion for International Application No. PCT/US2020/045292, dated Jan. 26, 2021, 11 pages.

*Primary Examiner* — Nguyen T Vo
(74) *Attorney, Agent, or Firm* — Nutter McClennen & Fish LLP

(57) ABSTRACT

Exemplary embodiments dynamically select the LO frequency and mixer mode (i.e., low-side LO injection or high-side LO injection) for upconversion based on the desired RF output frequency in order to mitigate the effects of spurious and LO leakage signals that could violate radiation emission limits, e.g., in the case where the IF signal frequency is smaller than the RF operating band. By dynamically switching the LO frequency and mixer mode as a function of the requested operating RF channel, low-level emissions and spurious signal compliance with restricted bands can be achieved.

20 Claims, 5 Drawing Sheets

(56) References Cited

U.S. PATENT DOCUMENTS

| | | | |
|---|---|---|---|
| 2007/0037546 A1* | 2/2007 | Steed, Jr. | H04B 1/28 |
| | | | 455/334 |
| 2007/0165748 A1* | 7/2007 | Khlat | H03D 3/002 |
| | | | 375/322 |
| 2008/0181340 A1* | 7/2008 | Maxim | H03D 7/165 |
| | | | 375/346 |
| 2009/0068973 A1* | 3/2009 | Saito | H04B 1/1027 |
| | | | 455/296 |
| 2009/0072912 A1* | 3/2009 | Kim | H03L 7/1072 |
| | | | 331/16 |
| 2012/0052822 A1 | 3/2012 | Monroe | |
| 2015/0334711 A1 | 11/2015 | Rangarajan et al. | |

* cited by examiner

FIG. 6    406

SPUR MITIGATION IN A HETERODYNE UPCONVERSION SYSTEM

CROSS-REFERENCE TO RELATED APPLICATION(S)

This patent application claims the benefit of U.S. Provisional Patent Application No. 62/884,421 entitled SPUR MITIGATION IN A HETERODYNE UPCONVERSION SYSTEM filed Aug. 8, 2019, which is hereby incorporated herein by reference in its entirety.

FIELD OF THE INVENTION

The invention generally relates to spur mitigation in a heterodyne upconversion system.

BACKGROUND OF THE INVENTION

The increased frequency spectrum available at mmWave has resulted in application scenarios where the IF frequency may be smaller than the operational RF bandwidth. In such cases, there may be instances in which the LO leakage signal and other spurious signals generated through mixing terms are unable to be adequately filtered if the transmission signal frequency is at, or close to, the upper or lower frequency band edge. This situation may be exacerbated in certain circumstances by the proximity of adjacent allocations of the frequency spectrum to other services that are especially sensitive to unintended spurious emissions.

Heterodyne upconversion is a standard technique for the frequency translation of an input signal, e.g., a baseband or IF (Intermediate Frequency) communication signal, to a higher frequency signal such as the carrier (RF) frequency used for transmission through a wireless channel to the receiver network. The process of upconversion (also known as mixing) naturally involves the use of nonlinear circuit functions to generate replica information signals at the carrier frequency, specifically by combining (e.g., multiplying) the input (e.g., IF) signal and a LO (Local Oscillator) signal via a nonlinear function. An ideal mixer produces two sideband signals, specifically RF=LO+IF and RF=LO−IF. The IF frequency is typically fixed, and the LO frequency is chosen so that one of these sidebands falls within the desired RF output frequency band, which is typically configurable. In actuality, mixers additionally produce other mixing products that can fall close to or within the target frequency range. These undesired products are deemed spurious signals, or more commonly spurs, that may cause impairment to the desired operation of the communication system.

One widely used mixing technique uses low-side LO injection, where the LO drive signal is lower in frequency than the desired output RF signal frequency. In this case, the desired signal would be extracted by taking the sum of the terms, (e.g., RF=LO+IF).

Another widely used mixing technique uses high-side LO injection, where the LO drive signal is higher in frequency than the desired output RF signal frequency. In this case, the desired signal would be extracted by taking the difference of the terms (e.g., RF=LO−IF).

FIG. 1 illustrates the general principle of a heterodyne upconversion process using low-side LO injection, as known in the art. As shown, the mixer produces the desired RF=LO+IF output signal and also produces undesired output signals including, in this case, the RF=LO−IF signal as well as an infinite number of spurious signals generated through the multiplicative process and direct leakage (feed-through) of the LO and input (e.g., IF) signals as a consequence of limited circuit isolation. The nonlinear behavior of the upconversion mixer is ensured by stimulating the circuit with a large magnitude LO signal that forces the operating point of the circuit into the nonlinear regime, i.e., the LO signal is typically many times larger than the input (e.g., IF) information signal.

The choice of whether to use low-side or high-side LO injection is generally made on a requirements basis. Management of the spurious signals to reduce or eliminate the deleterious effect upon system performance is achieved through the careful choice of LO and IF to minimize the magnitude of any spurious signals that fall within the wanted band. Also, the frequency separation typically is maximized between the desired band of operation and the higher magnitude spurious signals so that conventional filtering techniques can be used to reduce their distortive effect on the desired signal.

Furthermore, the fact that the LO signal is usually many times larger in magnitude than the input (e.g., IF) information signal at the input ports of the mixer means that special care needs to be taken to ensure that unwanted signals dependent upon the LO, whether as a result of mixing products or LO feedthrough, are reduced in magnitude at the output port.

One common technique is to include a signal filter at the RF output port that can remove or reduce the magnitude of the LO signal terms from being conducted to the transmitting antenna. FIG. 2 shows use of a filter at the output of the heterodyne upconverter to reduce out-of-band signals, as known in the art. The figure shows a bandpass filter as an example, but a lowpass or high-pass filter may also be used depending upon the required functionality. The signal rejection level of the filter is a function of several parameters but typically increases as the frequency separation between the desired signal (passband) and the out-of-band signal increases. A reduction in the frequency separation between the LO frequency and the RF frequency increases the unwanted signal level in the output network. In the limit, if the frequency separation between the LO and RF signal frequencies is less than the bandwidth of the desired signal (IF bandwidth), then the output filter does not provide any rejection of the LO feedthrough signal.

There are specific implementation challenges with heterodyne upconversion for millimeter-wave telecommunication systems. One issue is that the broad spectrum allocations may be more extensive in frequency than that supported by many traditional circuit components. For example, many existing commercial systems utilize an IF frequency of less than 3 GHz to leverage the broad multi-market and COTs components that are widely available. However, the n258 frequency band allocated for licensed communications systems is between 24.25-27.5 GHz, a span of 3.25 GHz. In this instance, the use of an IF frequency of 3 GHz would not provide any rejection of the LO signal when operating at the upper or lower edges of the operating band.

A second challenge is ensuring compatibility with existing and legacy systems. Minimizing the level of spurious emissions is a requirement to ensure that the operation of systems in adjacent and nearby frequency bands is unaffected. At lower frequencies, several available filter technologies can be used to provide a high degree of selectivity between adjacent spectrum allocations. At millimeter-wave frequencies, the technology choice is fewer; the degree of selectivity is more difficult because of the reduction in percentile bandwidth, and the mechanical requirements are more challenging because of the reduction in operating wavelength. A notable example is the close proximity of the aforementioned n258 band and the EESS (Earth Exploration Satellite-Service) band at 23.6-24 GHz. The allowable emission limits of spurious signals within the EESS band are tightly controlled and more restrictive than many other regions of the spectrum. These limits are challenging to meet with the low-level mixing products generated in the upconversion circuitry. Given that the LO leakage is typically orders of magnitude higher than the mixing products, it becomes even more of a problem if the LO signal falls within, or close to, the RF operating band such that it does not benefit from the additional signal suppression available from filtering. The maximum channel allocation in the n258 band is 800 MHz, and therefore there is no instance where the entire RF operating band is required to be operational at a single point in time.

SUMMARY OF VARIOUS EMBODIMENTS

In accordance with one embodiment of the invention, a mixing system capable of upconverting an input signal to a desired output frequency comprises a dual-mode upconversion circuit that is dynamically switchable between a low-side LO injection mode and a high-side LO injection mode and a controller configured to dynamically switch the dual-mode upconversion circuit between the low-side LO injection mode and the high-side LO injection mode based on a desired upconversion output frequency.

In various alternative embodiments, the controller may be configured to dynamically switch the dual-mode upconversion circuit to use the low-side LO injection mode when the desired upconversion output frequency is below a predetermined frequency and to use the high-side LO injection mode when the desired upconversion output frequency is above the predetermined frequency. In this regard, the mixing system may support a range of upconversion output frequencies, in which case the predetermined frequency may be substantially at the middle of the range of upconversion output frequencies. Additionally or alternatively, the predetermined frequency may be a predetermined intermediate frequency (IF). The system may include a tangible, non-transitory computer readable medium in which is stored a table mapping each of a number of output frequencies to a corresponding LO frequency and injection mode, in which case the controller may be configured to obtain from the table a desired LO frequency and injection mode based on the desired upconversion output frequency and dynamically switch the dual-mode upconversion circuit using the desired LO frequency and injection mode. The system may include a transmit circuit coupled to the dual-mode upconversion circuit for producing an unconverted transmit signal.

In various other alternative embodiments, the system may further include an LO signal generator for producing an LO signal. The LO generator may include a programmable synthesizer, in which case the controller may be configured to program the LO signal output frequency and to dynamically switch the dual-mode upconversion circuit based on the desired upconversion output frequency. Alternatively, the LO generator may include a switchable LO circuit comprising a low-side LO generator circuit configured to generate the LO signal for a predetermined low-side frequency range (e.g., 18-24 GHz), a high-side LO generator circuit configured to generate the LO signal for a predetermined high-side frequency range (e.g., 27-33 GHz), and switching circuitry configured to switch between the low-side LO generator circuit and the high-side LO generator circuit based on the desired upconversion output frequency. The dual-mode upconversion circuit may include an I-channel mixer circuit and a Q-channel mixer circuit, wherein the input signal is provided to an I-channel mixer via a −45 degree phase shifter and is provided to a Q-channel mixer via a +45 degree phase shifter, and wherein the LO signal is provided to the I-channel mixer via a programmable 180-degree hybrid and a +45 degree phase shifter and is provided to the Q-channel mixer via a programmable 180-degree hybrid and a −45 degree phase shifter, such that the 180-degree hybrids are controllable to dynamically select low-side LO injection or high-side LO injection. The system may includes a transmit circuit coupled to the dual-mode upconversion circuit for producing an unconverted transmit signal.

In still other alternative embodiments, the system may further include a dual-mode downconversion circuit that is dynamically switchable between a low-side LO injection mode and a high-side LO injection mode, in which case the controller may be configured to dynamically switch the downconversion circuit between the low-side LO injection mode and the high-side LO injection mode based on a downconversion input frequency. The system may further include a programmable synthesizer for producing an LO signal and a switch configured to selectively switch the LO signal between the dual-mode upconversion circuit and the dual-mode downconversion circuit, in which case the controller may be configured to selectively switch the LO signal between the dual-mode upconversion circuit and the dual-mode downconversion circuit based on a mixing mode. The system may further include a transceiver including a transmit circuit coupled to the dual-mode upconversion circuit for producing an upconverted transmit signal and a receive circuit coupled to the dual-mode downconversion circuit for producing a downconverted receive signal, in which case the controller may be configured to selectively switch the LO signal between the dual-mode upconversion circuit and the dual-mode downconversion circuit based on whether the transceiver is in a transmitting mode or a receiving mode.

In accordance with another embodiment of the invention, a dual mode mixer is dynamically switchable between a low-side LO injection mode and a high-side LO injection mode for converting an input signal to a desired output frequency. A dual-mode mixer may include a dual-mode mixer circuit and means for dynamically switching the dual-mode mixer circuit between a low-side LO injection mode and a high-side LO injection mode for converting an input signal to a desired output frequency.

In various alternative embodiments, the dual-mode mixer may include an I-channel mixer circuit and a Q-channel mixer circuit, wherein the input signal is provided to an I-channel mixer via a −45 degree phase shifter and is provided to a Q-channel mixer via a +45 degree phase shifter, and wherein the LO signal is provided to the I-channel mixer via a programmable 180-degree hybrid and a +45 degree phase shifter and is provided to the Q-channel mixer via a programmable 180-degree hybrid and a −45 degree phase shifter, such that the 180-degree hybrids are controllable to dynamically select low-side LO injection or high-side LO injection. The dual-mode mixer circuit may be an upconverter circuit or a downconverter circuit.

In accordance with another embodiment of the invention, a method for converting an input signal to a desired output frequency involves obtaining a desired output frequency and dynamically switching a dual-mode mixer into a low-side LO injection mode or a high-side LO injection mode based on the desired output frequency.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Figure 3:
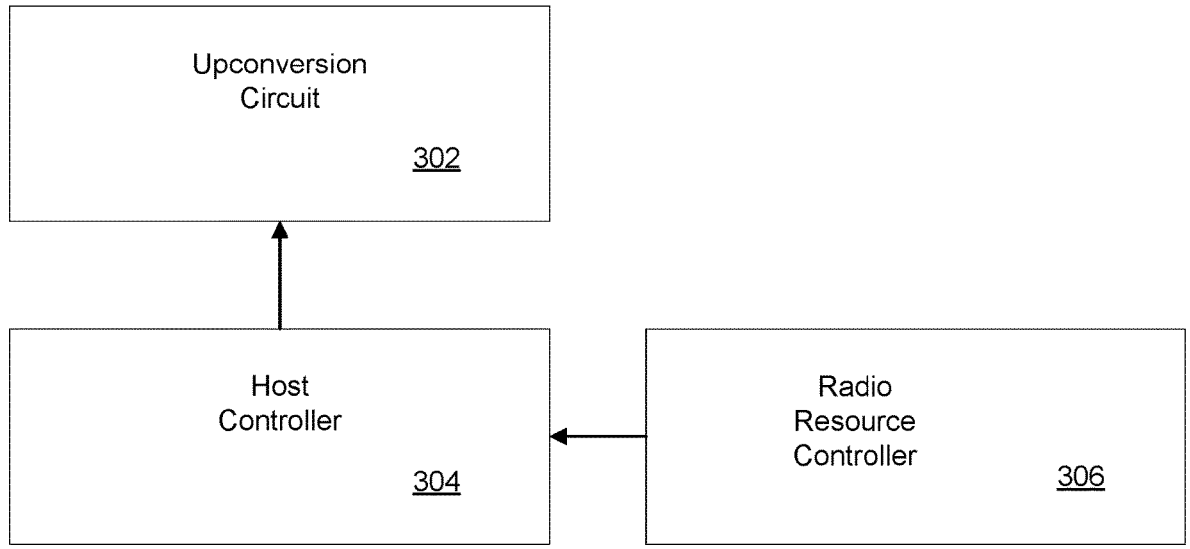
FIG. 3 is a schematic diagram showing a heterodyne upconversion system in accordance with certain exemplary embodiments.

Exemplary embodiments are described herein with reference to FIG. 3, which is a schematic diagram showing a heterodyne upconversion system 300 that includes an upconversion circuit 302, a host controller 304, and a Radio Resource Controller 306. The Radio Resource Controller 306 provides channel allocation instructions to the host controller 304 to select a desired RF output frequency. The host controller 304 in turn programs the upconversion circuit 302 (e.g., the LO frequency) based on the desired RF output frequency.

Exemplary embodiments dynamically select the LO frequency and mixer mode (i.e., low-side LO injection or high-side LO injection) for upconversion based on the desired RF output frequency specified by the Radio Resource Controller 306 in order to mitigate the effects of spurious and LO leakage signals that could violate radiation emission limits, e.g., in the case where the IF signal frequency is smaller than the RF operating band. By dynamically switching the LO frequency and mixer mode as a function of the requested operating RF channel, low-level emissions and spurious signal compliance with restricted bands can be achieved.

In certain exemplary embodiments, when the required output frequency falls within a lower portion of the operating band such that the input (e.g., IF) frequency is higher than the required output frequency, low-side LO injection is selected with an appropriate LO frequency so that the LO leakage falls outside of adjacent or nearby frequency bands (e.g., the EESS band when operating in the n258 band) and also benefits from further signal suppression by the stop-band of the signal filter. When the required output frequency falls within an upper portion of the operating band such that the input (e.g., IF) frequency is lower than the required output frequency, the LO signal would be problematic as it moves within both the passband of the RF filter as well as encroaching upon adjacent or nearby frequency bands (e.g., the EESS band when operating in the n258 band). In this case, high-side LO injection is selected with an appropriate LO frequency so that the LO leakage again falls outside of adjacent or nearby frequency bands (e.g., the EESS band when operating in the n258 band) and within the stop-band of the RF filter.

Figure 1:
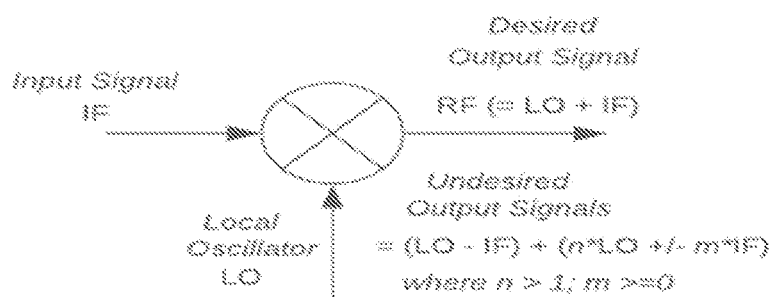
FIG. 1 illustrates the general principle of a heterodyne upconversion process using low-side LO injection, as known in the art.
Figure 2:
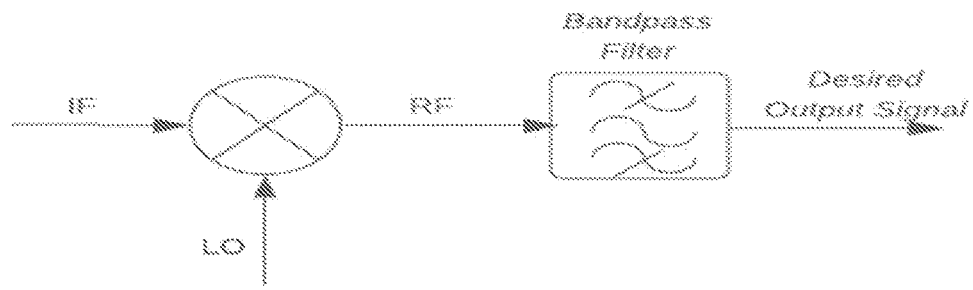
FIG. 2 shows use of a filter at the output of the heterodyne upconverter to reduce out-of-band signals, as known in the art.
Figure 4:
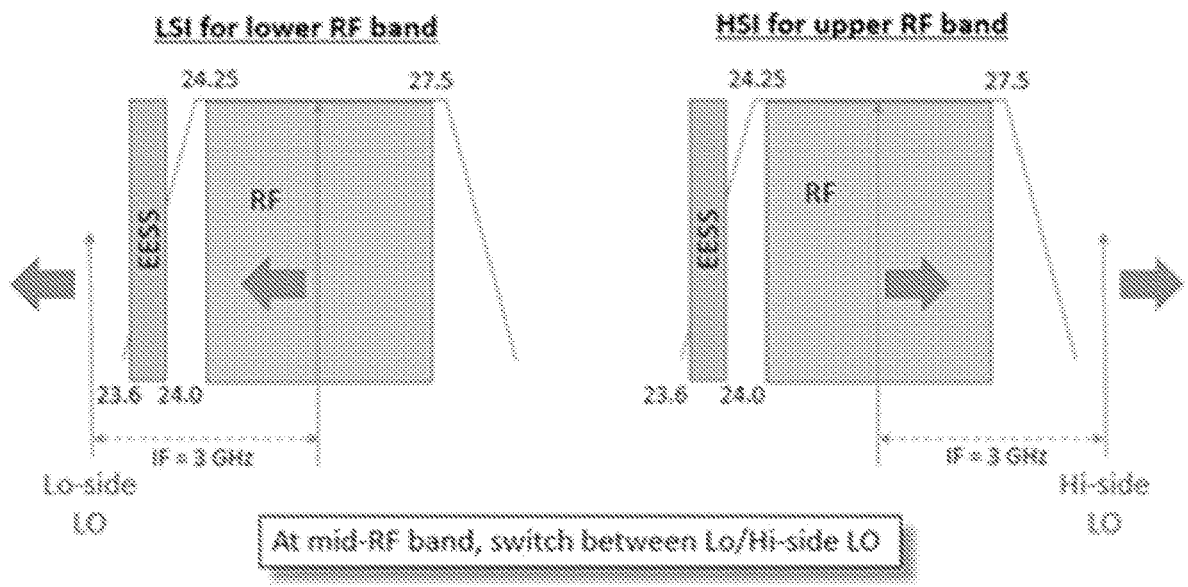
FIG. 4 is a schematic diagram showing a representation of dynamic switching of the LO frequency and mixer mode between low-side LO injection and high-side LO injection based on the desired RF output frequency, in accordance with one exemplary embodiment.

FIG. 4 is a schematic diagram showing a representation of dynamic switching of the LO frequency and mixer mode between low-side LO injection and high-side LO injection based on the desired RF output frequency, in accordance with one exemplary embodiment.

Figure 5:
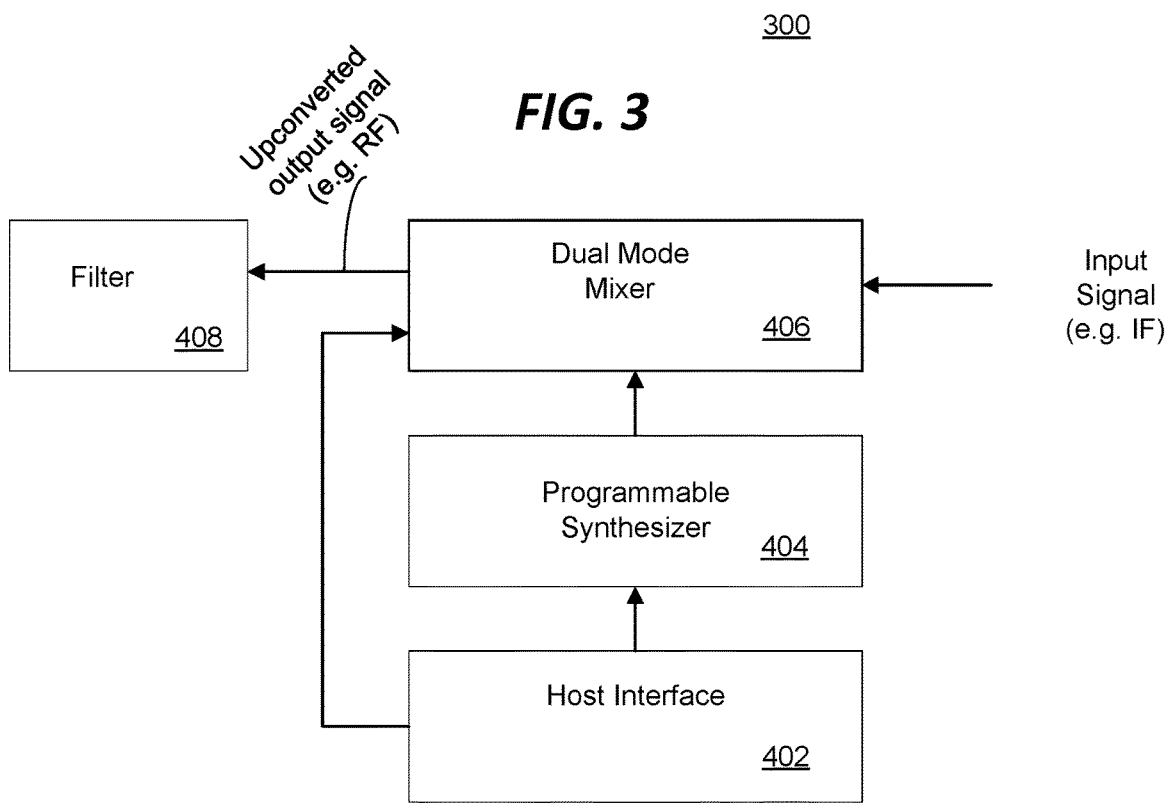
FIG. 5 is a schematic diagram of the upconversion circuit 302 of FIG. 3, in accordance with certain exemplary embodiments.

FIG. 5 is a schematic diagram of the upconversion circuit 302 of FIG. 3, in accordance with certain exemplary embodiments. Among other things, the upconversion circuit 302 includes a host interface 402 through which the upconversion circuit 302 interfaces with the host controller 304, a programmable synthesizer 404 that produces the LO signal based on an instruction provided by the host controller 304 via the host interface 402 (e.g., a control word that selects the LO frequency), and a dual mode upconversion mixer 406 that is dynamically switchable between low-side LO injection and high-side LO injection based on an instruction provided by the host controller 304 via the host interface 402 (e.g., a single bit indicating low-side versus high-side LO injection). As discussed above, the upconverted output signal is typically filtered by a filter 408.

In this example, the host controller 304 is configured to determine the required synthesizer and mixer mode configurations as a function of the frequency channel allocated by the Radio Resource Controller 306 and to program the synthesizer 404 and mixer 406 accordingly. Specifically, when the required output frequency is below the input (e.g., IF) frequency, the host controller 304 programs the mixer 406 into the low-side LO injection mode and programs the synthesizer 404 to output the appropriate LO frequency for producing the required output frequency, and when the required output frequency is above the input (e.g., IF) frequency, the host controller 304 programs the mixer 406 into the high-side LO injection mode and programs the synthesizer 404 to output the appropriate LO frequency for producing the required output frequency. The host controller 304 may be configured to determine the required synthesizer and mixer mode configurations in any of a variety of ways, e.g., calculated dynamically based on the required output frequency or via a look-up table that stores a synthesizer configuration and a mixer mode configuration for each of a number of output channels or frequencies. The following is an example of such a look-up table, where there are N output channels (channels CH 1 through CH N) below the input (e.g., IF) frequency:

|  | Channel Allocation | LO Frequency Configuration | Mixer Mode Configuration |
|---|---|---|---|
| Input Frequency | CH 1 | LO 1 | Low-Side |
|  | CH2 | LO 2 | Low-Side |
|  | CH3 | LO 3 | Low-side |
|  | . | | |
|  | . | | |
|  | . | | |
|  | CH N + 1 | LO N + 1 | High-Side |
|  | CH N + 2 | LO N + 2 | High-Side |
|  | . | | |
|  | . | | |
|  | . | | |

Thus, for example, the LO frequency configuration and mixer mode configuration for each output channel can be pre-calculated and stored. Also, while the above example uses low-side LO injection for RF frequencies below the input (e.g., IF) frequency and uses high-side LO injection for RF frequencies above the input (e.g., IF) frequency, embodiments of the invention are not necessarily limited to such a restriction. Thus, for example, there may be cases where low-side LO injection can or should be used for one or more output frequencies below the input (e.g., IF) frequency and there may be cases where high-side LO injection can or should be used for one or more output frequencies above the input (e.g., IF) frequency.

Figure 6:
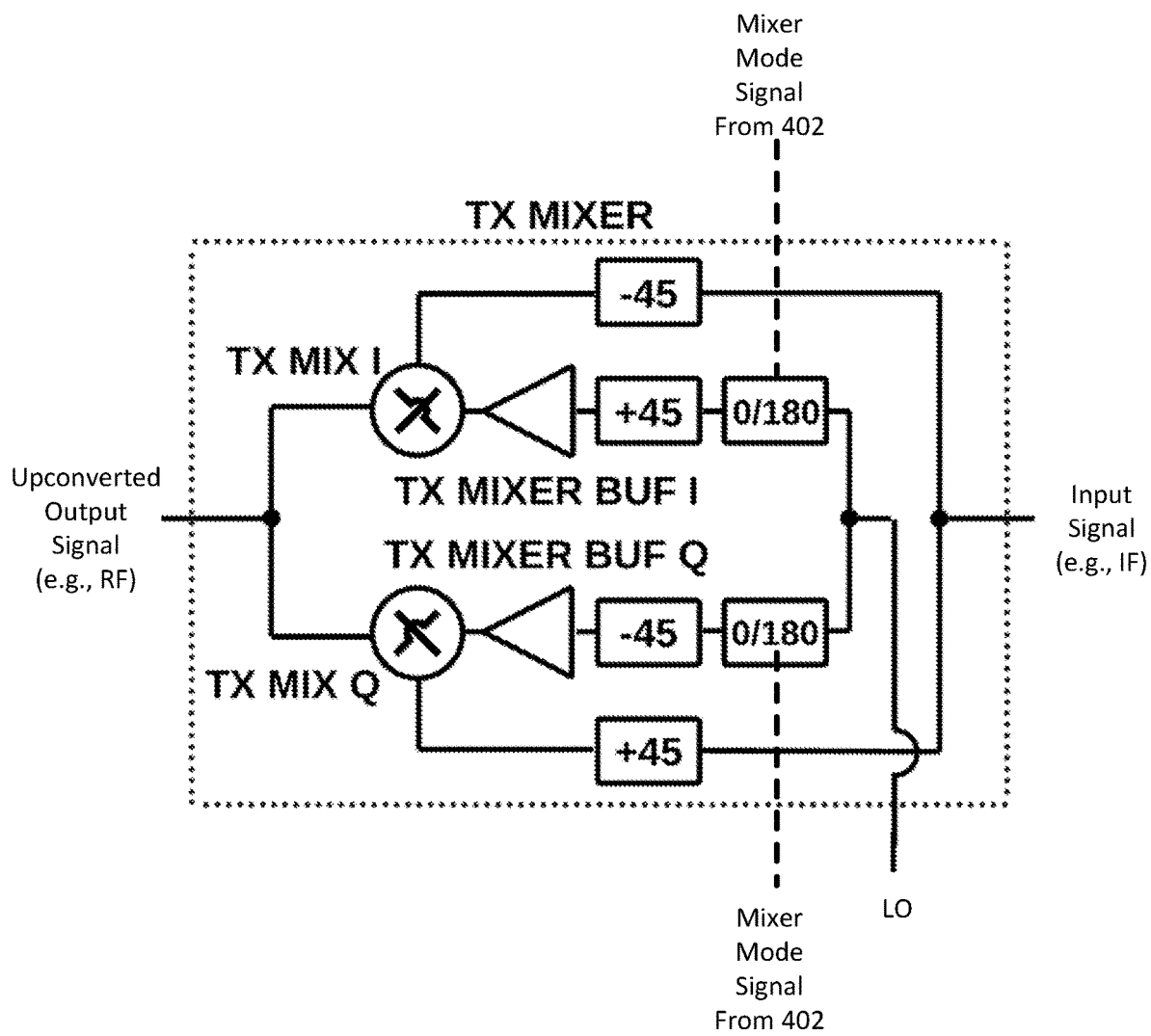
FIG. 6 is a schematic diagram of the dual mode upconversion (TX) mixer 406 of FIG. 5, in accordance with certain exemplary embodiments.

FIG. 6 is a schematic diagram of the dual mode upconversion (TX) mixer 406 of FIG. 5, in accordance with certain exemplary embodiments. In this example, the dual mode upconversion (TX) mixer 406 includes I and Q channel mixer circuits. The input signal is provided to an I-channel mixer via a −45 degree phase shifter and is provided to a Q-channel mixer via a +45 degree phase shifter. The LO signal is provided to the I-channel mixer via a programmable 180-degree hybrid and a +45 degree phase shifter and is provided to the Q-channel mixer via a programmable 180-degree hybrid and a −45 degree phase shifter. The 180-degree hybrids are controlled via the mixer mode signal from the host interface 402 to dynamically select low-side LO injection or high-side LO injection.

Figure 7:
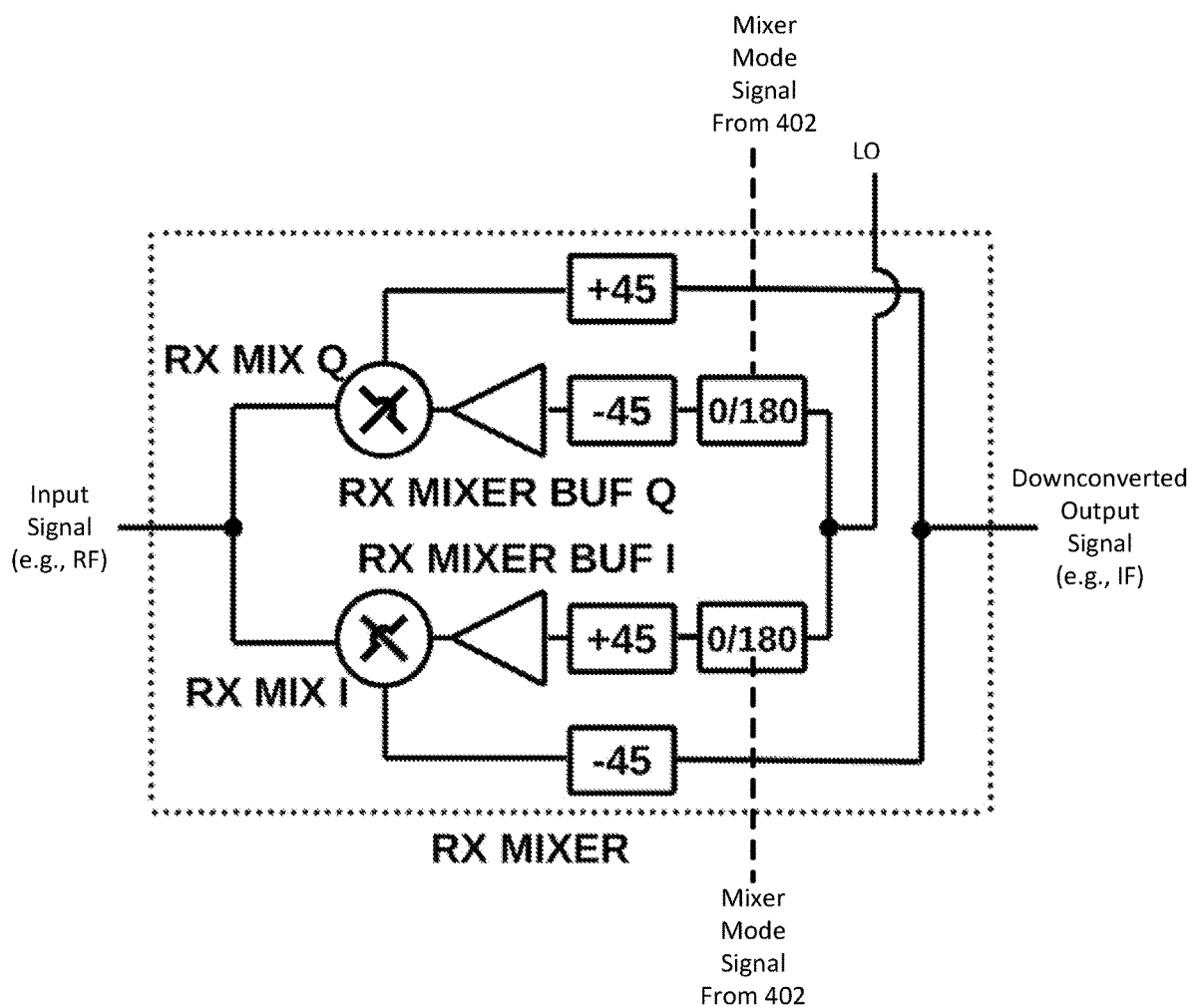
FIG. 7 is a schematic diagram of a dual mode downconversion (RX) mixer in accordance with certain exemplary embodiments.

In certain exemplary embodiments, a received RF signal is downconverted, e.g., to an IF or baseband signal, using similar switching between low-side LO injection and high-side LO injection based on the receive RF frequency. FIG. 7 is a schematic diagram of a dual mode downconversion (RX) mixer in accordance with certain exemplary embodiments. As known in the art, the downconversion (RX) mixer operates essentially in the reverse of the upconversion (TX) mixer. As in the dual mode upconversion (TX) mixer, the 180-degree hybrids are controlled via the mixer mode signal from the host interface 402 to dynamically select low-side LO injection or high-side LO injection for the downconversion. Similar to the upconversion, the downconversion LO frequency and mixer mode can be selected based on the RF frequency, e.g., using the same table used for selecting the upconversion parameters. A switch can be included in the system to selectively switch the LO signal from the programmable synthesizer 404 to the TX mixer or RX mixer depending on whether the transceiver is transmitting or receiving.

In certain exemplary embodiments, the programmable synthesizer 404 includes separate low-side and high-side LO synthesizers that are switchable to provide the appropriate LO signal to the upconversion and downconversion mixers.

Figure 8:
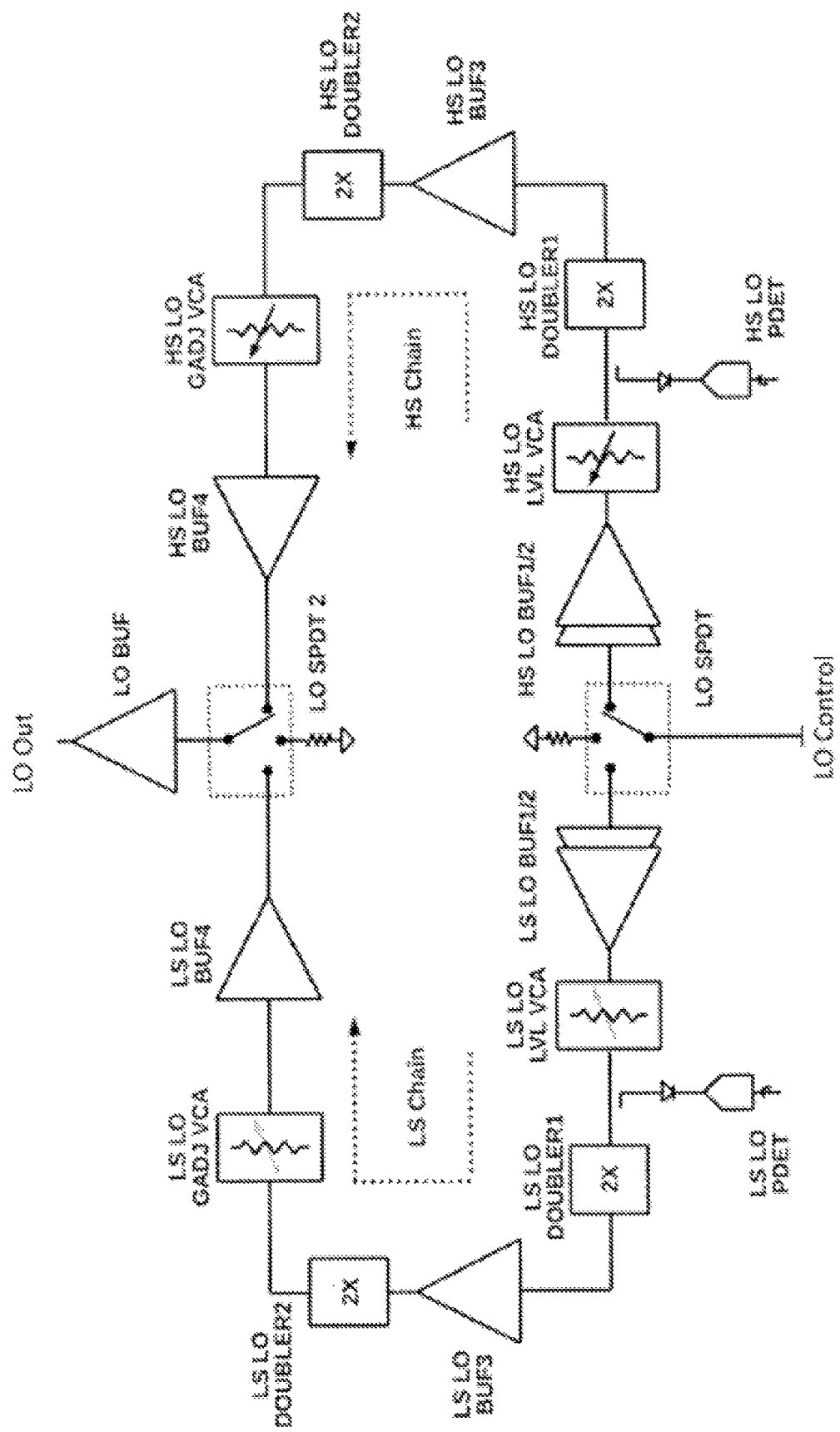
FIG. 8 is a schematic diagram of a switchable LO circuit, in accordance with certain exemplary embodiments.

FIG. 8 is a schematic diagram of a switchable LO circuit, in accordance with certain exemplary embodiments. Here, switchable LO circuit includes a low-side (LS) chain and a high-side (HS) chain. It should be noted that the present invention is not limited to the use of a switchable LO circuit, although the switchable LO circuit can simplify certain aspects of the system. For example, a single LO path might have to cover, say, 18-33 GHz to cover both the low-side and high-side frequency ranges. By splitting the LO path into two paths, there can be a low-side path of, say, 18-24 GHz, and a high-side path of, say, 27-33 GHz, which can be easier to design or implement.

It should be noted that, in some exemplary embodiments, the host controller 304 may be considered part of the upconversion circuit 302 itself such that, for example, the upconversion circuit 302 determines the synthesizer and mixer operating parameters based on channel allocation instructions from the Radio Resource Controller 306 without the need for a separate host controller and host interface.

Certain aspects described above (e.g., the functionality performed by the host controller 304 or host controller functionality incorporated into the upconversion circuit 302 for determining and/or programming an LO frequency and mixer mode) may be implemented as a computer program product including a series of computer instructions fixed on a tangible, non-transitory computer readable medium, such as a diskette, CD-ROM, ROM, or fixed disk. The series of computer instructions can embody all or part of the functionality previously described herein.

Those skilled in the art should appreciate that such computer instructions can be written in a number of programming languages for use with many computer architectures or operating systems. For example, some embodiments may be implemented in a procedural programming language (e.g., "C"), or in an object-oriented programming language (e.g., "C++"). Furthermore, such instructions may be stored in any memory device, such as semiconductor, magnetic, optical or other memory devices, and may be transmitted using any communications technology, such as optical, infrared, microwave, or other transmission technologies. Other embodiments of the invention may be implemented as a pre-configured, stand-alone hardware element and/or as preprogrammed hardware elements (e.g., application specific integrated circuits, FPGAs, and digital signal processors), or other related components. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., a specially-programmed host controller 304) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A mixing system capable of upconverting an input signal of around 3 GHz to a desired output frequency in the n258 band within acceptable EESS band interference limits, the mixing system comprising:
    a programmable local oscillator (LO) signal generator for producing an LO signal having a selected LO frequency;
    a dual-mode upconversion circuit that is dynamically switchable between a low-side LO injection mode and a high-side LO injection mode; and
    a controller configured to dynamically program the LO signal generator and the dual-mode upconversion circuit LO injection mode based on a desired upconversion output frequency within the n258 band wherein the LO frequency and the LO injection mode are specifically configured such that LO leakage from combining the LO signal and the input signal falls outside of the EESS band.

2. A mixing system according to claim 1, wherein the controller is configured to use the low-side LO injection mode when the desired upconversion output frequency is below a predetermined frequency and to use the high-side LO injection mode when the desired upconversion output frequency is above the predetermined frequency.

3. A mixing system according to claim 2, wherein the mixing system supports a range of upconversion output frequencies, and wherein the predetermined frequency is substantially at the middle of the range of upconversion output frequencies.

4. A mixing system according to claim 2, wherein the predetermined frequency is a predetermined intermediate frequency (IF).

5. A mixing system according to claim 1, further comprising a tangible, non-transitory computer readable medium in which is stored a table mapping each of a number of output frequencies to a corresponding LO frequency and LO injection mode, and wherein the controller is configured to obtain from the table a desired LO frequency and LO injection mode based on the desired upconversion output frequency and dynamically program the LO signal generator and the dual-mode upconversion circuit using the desired LO frequency and LO injection mode.

6. A mixing system according to claim 1, further comprising:
    a transmit circuit coupled to the dual-mode upconversion circuit for producing an upconverted transmit signal.

7. A mixing system according to claim 1 wherein the LO signal generator comprises:
    a programmable synthesizer.

8. A mixing system according to claim 1 wherein the LO signal generator comprises:
    a switchable LO circuit comprising a low-side LO generator circuit configured to generate the LO signal for a predetermined low-side frequency range, a high-side LO generator circuit configured to generate the LO signal for a predetermined high-side frequency range, and switching circuitry configured to switch between the low-side LO generator circuit and the high-side LO generator circuit based on the desired upconversion output frequency.

9. A mixing system according to claim 8, wherein the low-side LO generator circuit is configured to generate the LO signal for a frequency range of 18-24 GHz, and wherein the high-side LO generator circuit is configured to generate the LO signal for a frequency range of 27-33 GHz.

10. A mixing system according to claim 1, wherein the dual-mode upconversion circuit comprises:
    an I-channel mixer circuit; and
    a Q-channel mixer circuit, wherein the input signal is provided to an I-channel mixer via a −45 degree phase shifter and is provided to a Q-channel mixer via a +45 degree phase shifter, and wherein the LO signal is provided to the I-channel mixer via a programmable 180-degree hybrid and a +45 degree phase shifter and is provided to the Q-channel mixer via a programmable 180-degree hybrid and a −45 degree phase shifter, such that the 180-degree hybrids are controllable to dynamically select low-side LO injection or high-side LO injection.

11. A mixing system according to claim 10, further comprising:
    a transmit circuit coupled to the dual-mode upconversion circuit for producing an upconverted transmit signal.

12. A mixing system according to claim 1, further comprising:
    a dual-mode downconversion circuit that is dynamically switchable between a low-side LO injection mode and a high-side LO injection mode, wherein the controller is configured to dynamically switch the downconversion circuit between the low-side LO injection mode and the high-side LO injection mode based on a downconversion input frequency.

13. A mixing system according to claim 12, further comprising:
    a switch configured to selectively switch the LO signal between the dual-mode upconversion circuit and the dual-mode downconversion circuit, wherein the controller is configured to selectively switch the LO signal between the dual-mode upconversion circuit and the dual-mode downconversion circuit based on a mixing mode.

14. A mixing system according to claim 12, further comprising:
    a transceiver including a transmit circuit coupled to the dual-mode upconversion circuit for producing an upconverted transmit signal and a receive circuit coupled to the dual-mode downconversion circuit for producing a downconverted receive signal, wherein the controller is configured to selectively switch the LO signal between the dual-mode upconversion circuit and the dual-mode downconversion circuit based on whether the transceiver is in a transmitting mode or a receiving mode.

15. A dual mode mixer for converting between an n258 band signal and an intermediate frequency (IF) signal of around 3 GHz within acceptable EESS band interference limits, the dual mode mixer comprising:
    a programmable local oscillator (LO) signal generator for producing an LO signal having a selected LO frequency;
    a dual-mode mixer circuit that is dynamically switchable between a low-side LO injection mode and a high-side LO injection mode to convert between the n258 band signal and the IF signal based on the LO signal; and a controller configured to dynamically program the LO signal generator and the dual-mode mixer circuit LO injection mode based on the n258 band signal wherein the LO frequency and the LO injection mode are specifically configured such that LO leakage from the dual-mode mixer circuit falls outside of the EESS band.

16. A dual-mode mixer according to claim 15, comprising:

an I-channel mixer circuit; and a Q-channel mixer circuit, wherein the input signal is provided to an I-channel mixer via a −45 degree phase shifter and is provided to a Q-channel mixer via a +45 degree phase shifter, and wherein the LO signal is provided to the I-channel mixer via a programmable 180-degree hybrid and a +45 degree phase shifter and is provided to the Q-channel mixer via a programmable 180-degree hybrid and a −45 degree phase shifter, such that the 180-degree hybrids are controllable to dynamically select low-side LO injection or high-side LO injection.

17. A dual-mode mixer according to claim 15, wherein the dual-mode mixer circuit is an upconverter circuit.

18. A dual-mode mixer according to claim 15, wherein the dual-mode mixer circuit is a downconverter circuit.

19. A method for converting between an n258 band signal and an intermediate frequency (IF) signal of around 3 GHz within acceptable EESS band interference limits, the method comprising:

programming a programmable local oscillator (LO) signal generator to produce an LO signal having a selected LO frequency; and programming a dual-mode mixer circuit that is dynamically switchable between a low-side LO injection mode and a high-side LO injection mode to convert between the n258 band signal and the IF signal based on the LO signal, wherein the LO frequency and the LO injection mode are specifically programmed such that LO leakage from the dual-mode mixer circuit falls outside of the EESS band.

20. A method according to claim 19, wherein at least one of:

the dual-mode mixer circuit is an upconverter circuit; or the dual-mode mixer circuit is a downconverter circuit.

* * * * *